United States Patent [19]
Viano et al.

[11] Patent Number: 5,378,043
[45] Date of Patent: Jan. 3, 1995

[54] VEHICLE PIVOTAL HEADREST

[75] Inventors: David C. Viano, Bloomfield Hill; Richard J. Neely, Casco; Mladen Humer, East Detroit, all of Mich.

[73] Assignee: General Motors Corporation, Detroit, Mich.

[21] Appl. No.: 69,317

[22] Filed: Jun. 1, 1993

[51] Int. Cl.6 .............................................. B60R 21/00
[52] U.S. Cl. ................................ 297/408; 297/216.12
[58] Field of Search ............... 297/391, 399, 404, 405, 297/408–410, 216.1, 216.12

[56] References Cited

U.S. PATENT DOCUMENTS

| | | | |
|---|---|---|---|
| 2,636,552 | 4/1953 | Long | 297/216.12 X |
| 2,973,029 | 2/1961 | Schlosstein | 155/173 |
| 3,065,029 | 11/1962 | Spound et al. | 297/391 |
| 3,310,342 | 3/1967 | Drelichowski | 297/395 |
| 3,449,012 | 6/1969 | Caron | 297/403 |
| 3,488,090 | 1/1970 | Douglas | 297/389 |
| 3,586,366 | 6/1971 | Patrick | 297/391 |
| 3,655,241 | 4/1972 | Herzer et al. | 297/396 X |
| 3,866,723 | 2/1975 | Smith | 297/216.1 X |
| 3,929,374 | 12/1975 | Hogan et al. | 297/61 |
| 3,964,788 | 6/1976 | Kmetyko | 297/395 |
| 4,082,354 | 4/1978 | Renner et al. | 297/410 |
| 4,099,779 | 7/1978 | Goldner | 297/408 |
| 4,278,291 | 7/1981 | Asai | 297/391 |
| 4,285,545 | 8/1981 | Protze | 297/483 |
| 4,312,538 | 1/1982 | Kennedy et al. | 297/408 |
| 4,511,180 | 4/1985 | Klaus | 297/408 |
| 4,623,166 | 11/1986 | Andres et al. | 297/403 X |
| 4,645,233 | 2/1987 | Bruse et al. | 280/808 |
| 4,720,146 | 1/1988 | Mawbey et al. | 297/409 |
| 4,762,367 | 8/1988 | Denton | 297/409 |
| 4,822,102 | 4/1989 | Duvenkamp | 297/403 |
| 4,861,107 | 8/1989 | Vidwaus et al. | 297/391 X |
| 4,977,973 | 12/1990 | Takizawa | 180/271 |
| 5,181,763 | 1/1993 | Dellanno et al. | 297/391 |
| 5,205,585 | 4/1993 | Reuber et al. | 280/753 |

FOREIGN PATENT DOCUMENTS

| | | | |
|---|---|---|---|
| 2206329 | 9/1972 | Germany . | |
| 2232726 | 1/1974 | Germany | 297/216.12 |
| 2430572 | 1/1976 | Germany | 297/391 |
| 2644485 | 4/1978 | Germany | 297/391 |
| 3131633 | 2/1983 | Germany | 297/403 |

Primary Examiner—Peter R. Brown
Assistant Examiner—Milton Nelson, Jr.
Attorney, Agent, or Firm—Ernest E. Helms

[57] ABSTRACT

A vehicle seat and headrest arrangement is provided including a seat bun frame having fore and aft ends, a seatback frame joined to the bun frame adjacent the aft end of the bun frame, and a headrest pivotally attached with the seatback frame along a pivotal axis generally perpendicular to the fore and aft direction whereby, upon a rear vehicle impact, the headrest moves in a forward direction toward the head of a vehicle seat occupant.

12 Claims, 3 Drawing Sheets

VEHICLE PIVOTAL HEADREST

FIELD OF THE INVENTION

The field of the present invention is that of seat headrest arrangements and methods of utilization thereof.

BACKGROUND OF THE INVENTION

Headrests are known in the vehicle seating art. Examples of vehicle seat headrests can be found be found by review of Duvenkamp U.S. Pat. No. 4,822,102 and Denton U.S. Pat. No. 4,762,367.

The present invention provides a vehicle seat headrest arrangement which provides an alternative to the aforementioned patents with special unique advantages to be explained later herein.

DESCRIPTION OF THE PREFERRED EMBODIMENTS

Figure 1:
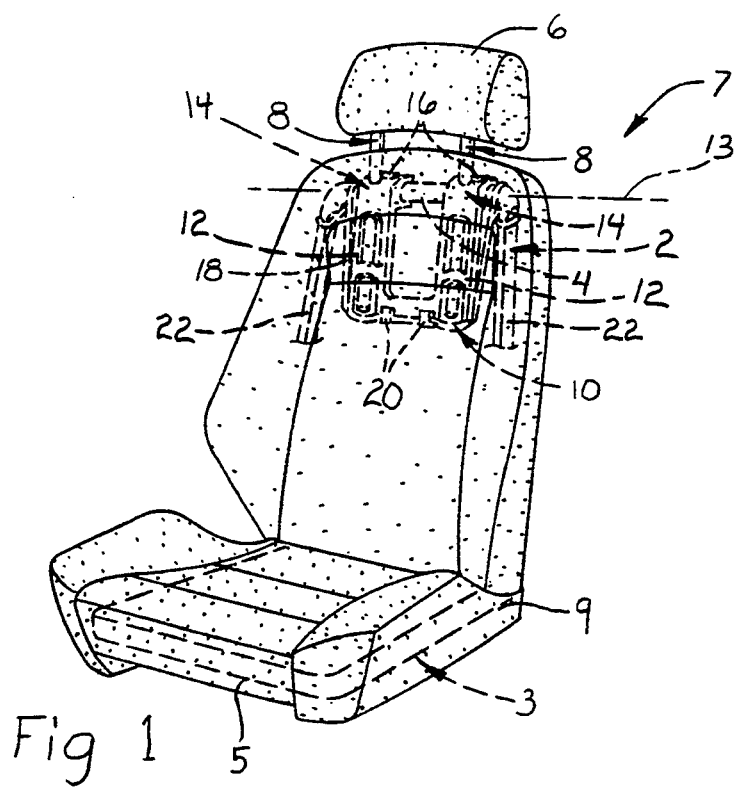
FIG. 1 is a perspective view of a preferred embodiment according to the present invention.

Referring to FIG. 1, the vehicle seat and headrest arrangement 7 of the present invention has a seat bun frame 3. The seat bun frame 3 has fore 5 and aft 9 ends generally positionally aligned with the fore and aft segments of the vehicle in which the seat and headrest arrangements 7 is placed. Joined to the seat bun frame 3 generally adjacent its aft end 9 is a seatback frame 2. The seatback frame 2 is generally in the shape of an inverted U having two risers or sides 22 joined by a cross frame member 4. Typically, the seat bun and back frames 3, 2 will be made from steel, metallic or other structural members.

Providing a surface for contact with the head of a vehicle seat occupant is a headrest cushion 6. The headrest cushion 6 has extending therefrom two posts 8. An impact target or plate 10 is pivotally mounted to the cross member 4 along a fixed pivotal axis 13 generally perpendicular to the fore and aft direction of the vehicle. The plate 10 has two formed alignment members 12 for each respective post 8 for mounting of the headrest cushion 6 to the seatback frame 2. The headrest posts 8 are adjustable vertically with respect to the plate 10 in a manner conventional for that of vehicle seat headrests.

The plate 10 mentioned previously is pivotally mounted with respect to the cross member 4 by virtue of its clamped ends 14. The clamped ends 14 are joined to the cross member 4 by the use of a metal clip 16 which has flanges 26 that pop into apertures 15 (only one shown) of the clamped end 14. To stabilize the headrest cushion 6 in position and to prevent its rotation except at a threshold amount of force, there is a spring 18 which wraps around the intersection of the risers 22 with the cross member 4. The spring 18 extends downwardly and is held to the plate 10 by clips 20. Rearward loading of the plate 10 will cause the headrest cushion 6 to pivot toward the head of a seat occupant. The loading required for pivotal movement of the headrest cushion 6 can be set to occur only during an instance where a vehicle seat occupant is seated in the seat and the vehicle undergoes acceleration due to a rear impact-type situation. Alternatively, the spring 18 can be configured or sized to be easily movable at lower pressure levels and then plastically deform under predetermined loads representative of a rear impact-type situation. The pivoting of the headrest cushion 6 forwardly also has a beneficial effect of raising the relative height of the headrest 6 with respect to the seat bun frame from a height of 17 to 19 as shown in FIG. 3.

Figure 2:
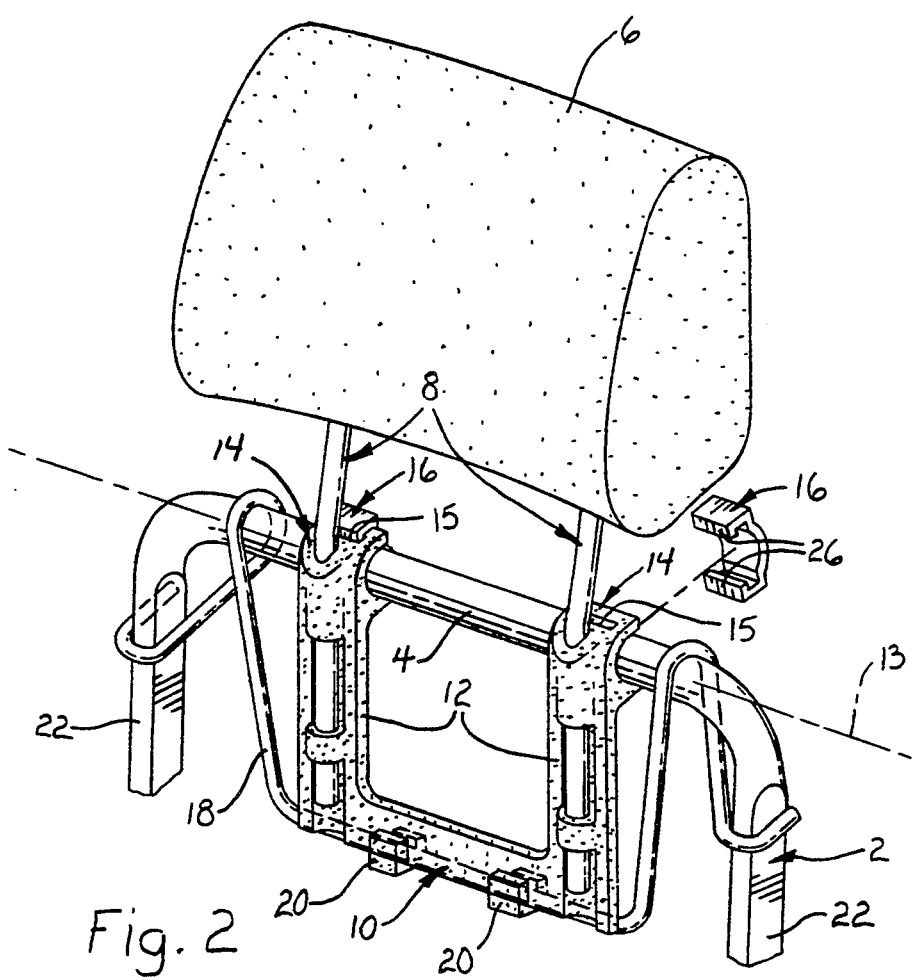
FIG. 2 is an enlarged view of the headrest shown in FIG. 1 with portions of the seatback cushion removed for clarity of illustration.
Figure 3:
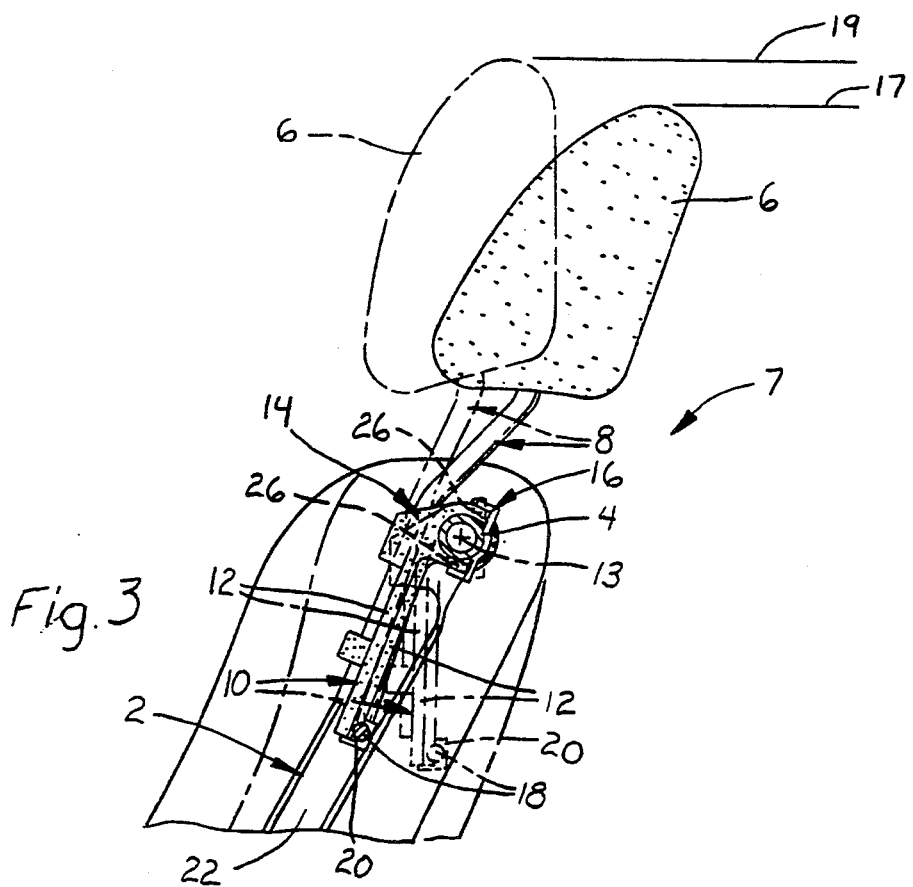
FIGS. 3 and 5 are side views illustrating operation of the headrest shown in FIGS. 2 and 4, respectively.
Figure 4:
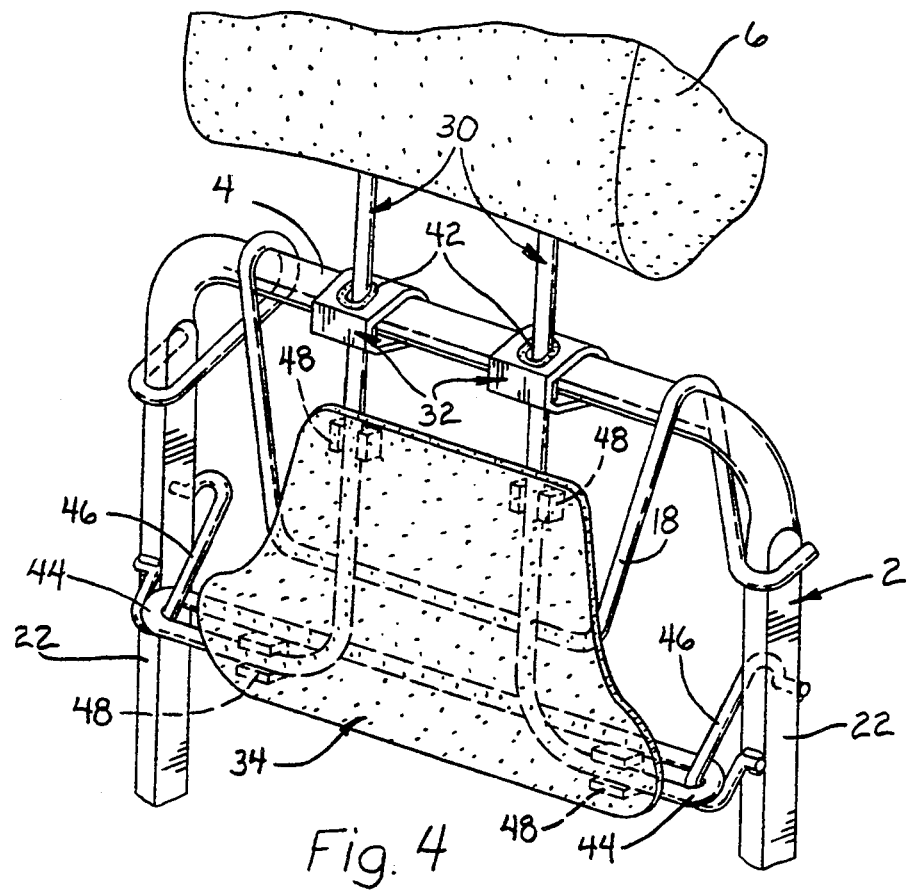
FIG. 4 is a perspective view of an alternate preferred embodiment of the present invention.
Figure 5:
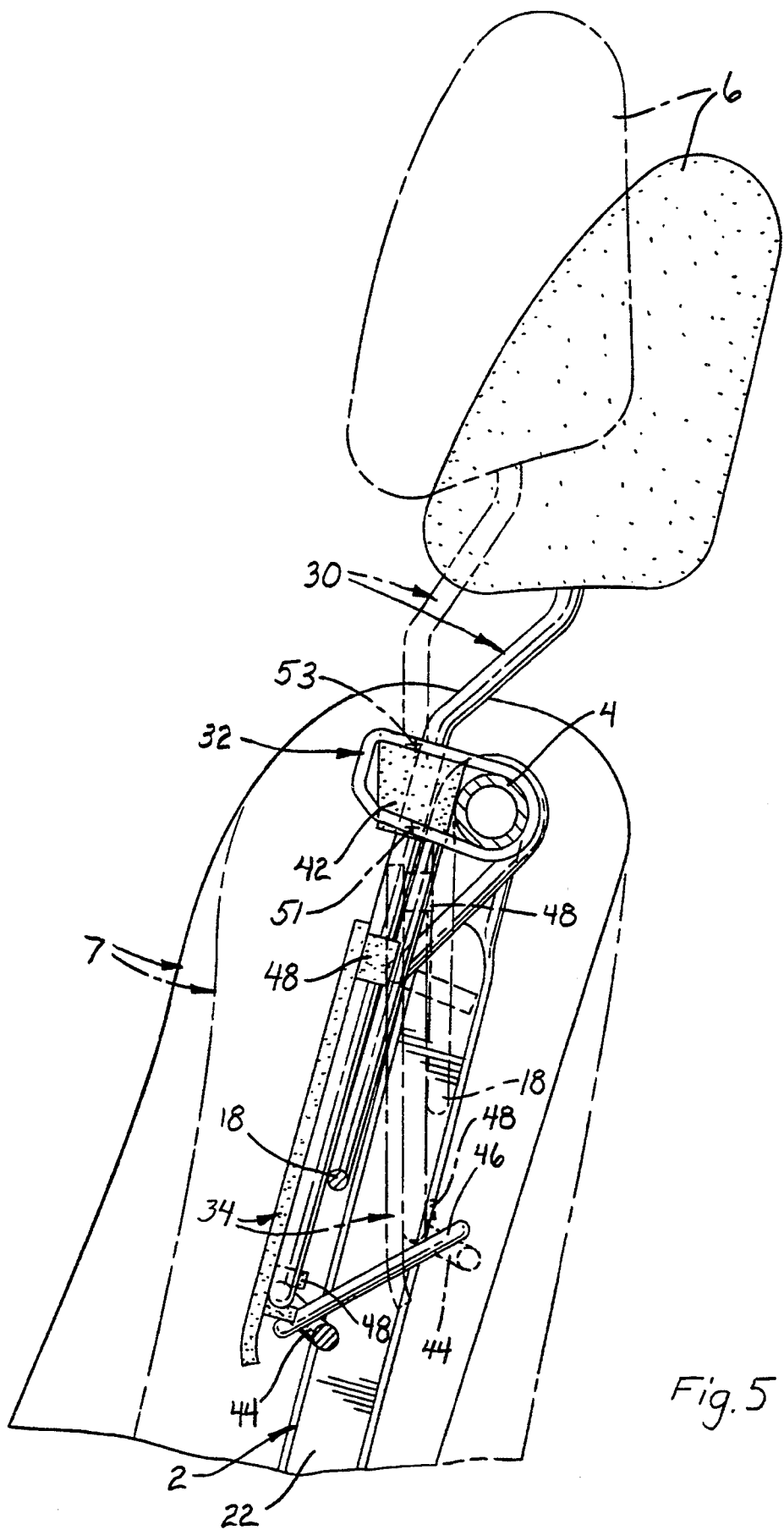

Referring additionally to FIGS. 4 and 5, an alternate preferred embodiment of the present invention is brought forth with similar items providing the same function given like numerals as that shown in FIGS. 1 through 3. In FIG. 4, the posts 30 are held to the cross member 4 by penetration through an elastomeric bushing 42 which is mounted in a clip 32 which is fitted on the cross member 4. The posts additionally extend downwardly, having loop sections 44 which are directed by two angular cam guides 46 which have a generally downward slope projecting generally forwardly. The impact plate 34 is attached with the post by four clips 48. A spring 18 biases the headrest cushion 6 against rotation by contact with the post 30.

A force placed upon the plate 34 causes the posts 30 to have a variable axis of rotation with respect to the cross member 4 since the cam guides 46 will cause the posts 30 to rise upwardly after a sufficient force has been imparted to the plate 34. Also, the interaction of loop sections 44 with the cam guides 46 will cause the headrest cushion 6 to be rotated slightly forwardly (FIG. 5).

Upon a sufficient push on the plate 34, the posts have an axis of rotation noted as 51. On a rear impact of sufficient magnitude, the posts 30 will be translated upward with respect to the clips 32, placing the headrest cushions 6 in a higher and more forward position. The axis of rotation 51 will be constant with respect to the clips 32. However, the projection of the axis of rotation on the post 30 at the initial impact will be translated to point 53 due to the extending upward motion of the posts 30. Therefore, the axis of rotation of the post 30 with respect to the cross member 4 is nonfixed with respect to the post 30.

In normal vehicle seat and headrest arrangements, during the initial stages of a rear impact, the occupant's torso is in contact with the seatback but the head is several inches forward of the headrest. This condition is consistent with the body being reclined at about 20 degrees from vertical with the neck being approximately vertical. In contrast, the seat is usually at a reclined angle of approximately 25 degrees from vertical, and the headrest either follows the contour of the seatback or curves slightly forward. However, for seating comfort, the head is usually not in contact with the headrest while driving. As the occupant loads the seatback in a rear impact, force builds up behind the torso and buttocks of the seat occupant. Depending upon the compliance of the seatback, the occupant compresses into the cushion but the head, neck and torso move in unison. Typically, there is a greater compression in the buttocks region of the seat occupant, with a gradual reduction up to the shoulder level as the body remains upright. The more severe the crash, the greater the compression of the occupant into the seatback. As this action is occurring, the initial load of the occupant attempts to deflect the seatback rearwardly. The amount of deflection is related to the bending stiffness of the seatback. However, the seatback may possibly deflect under the torso load prior to the head and neck of the occupant contacting the headrest. Therefore, in a conventional seat, there may exist a gap between the head and headrest in the crash situation. In the present invention, the force of the occupant's torso being cast into the seat causes the impact plate 34 or 10 to cause the headrest cushion 6 to rotate toward the vehicle occupant. The greater the rear crash acceleration, the greater the resultant force on the seat occupant and the greater the forward rotation and outward movement of headrest 6. An additional advantage is found in the embodiment shown in FIGS. 4 and 5 in that the headrest cushion 6 (and post 30) moves upwardly, thereby increasing the relative height or outward position of the headrest cushion 6 with respect to the seat occupant's head and minimizing any possible gap between the head and the headrest cushion 6. The above action of the headrest cushion 6 provides a more idealized condition for taller seat occupants.

While this invention has been described in terms of preferred embodiments thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A vehicle seat and headrest arrangement comprising:
    a seat bun frame having fore and aft ends;
    a seatback frame joined to the bun frame means adjacent the aft end of the bun frame; and
    a headrest pivotally attached with the seatback frame along a pivotal axis generally perpendicular to the fore and aft direction whereby, upon a rear impact of a vehicle in which the arrangement is mounted, the pivotal attachment allows the headrest to move in a forward direction toward the head of an occupant of the vehicle seat, wherein the headrest has a cushion portion and an impact target operatively associated with the cushion portion and pivotally associated with the seatback frame, wherein a force upon the impact target causes the headrest to rotate forwardly.

2. An arrangement as described in claim 1 further comprising a spring operatively associated with the seatback frame biasing the headrest against pivotal movement.

3. An arrangement as described in claim 2 wherein the spring elastically biases the headrest against pivotal movement up to a predetermined limit and thereafter plastically deforms.

4. An arrangement as described in claim 1 wherein the headrest effectively extends upwardly upon its pivotal movement toward the head of a seat occupant.

5. An arrangement as described in claim 8 wherein the headrest is connected with a post, and the headrest extends rearwardly of the pivotal axis of the headrest.

6. An arrangement as described in claim 1 wherein the headrest cushion portion is separated from the seatback frame by a post.

7. An arrangement as described in claim 6 wherein the post is positionably held by a clamp having a generally fixed pivotal axis with a cross member of the seatback frame.

8. An arrangement as described in claim 6 having said impact target operatively associated with at least one cam guide member.

9. An arrangement as described in claim 6 further including the seatback frame having a cross member and wherein the post is operatively associated with the impact target and a cam guide to direct the impact target and wherein the post has a pivotal axis with respect to the cross member which is non-fixed with respect to the post upon impact upon the impact target, causing the headrest to pivot forwardly and extend upwardly.

10. A vehicle seat and head rest arrangement comprising:
    a seat bun frame having fore and aft ends;
    a seatback frame joined to the bun frame adjacent the aft end of the bun frame;
    a headrest pivotally attached with the seatback frame along a pivotal axis generally perpendicular to fore and aft direction; and
    a target pivotally mounted to the seatback along a pivotal axis generally perpendicular to the fore and aft direction underneath the headrest and operatively associated with the headrest wherein rearward loading of the target causes the headrest to pivot forwardly.

11. A method of providing a headrest for a vehicle seat having a seatback frame connected to an aft end of a fore and aft seat bun frame, the method comprising:
    pivotally attaching a headrest which is operatively associated with an impact target, with a pivotal axis generally perpendicular to the fore and aft direction of the seat; and
    upon a rear impact of a vehicle in which the vehicle seat is mounted, contacting the impact target, thereby pivoting the headrest forward to contact a head of a seat occupant.

12. A method as described in claim 11 further comprising extending the headrest upwardly.

* * * * *

UNITED STATES PATENT AND TRADEMARK OFFICE
CERTIFICATE OF CORRECTION

PATENT NO. : 5,378,043
DATED : January 3, 1995
INVENTOR(S) : David C. Viano, Richard J. Neely, Mladen Humer It is certified that error appears in the above-identified patent and that said Letters Patent is hereby corrected as shown below:

Column 3, line 35, delete "means".

Signed and Sealed this

Eighteenth Day of July, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,378,043 C1
APPLICATION NO. : 90/009250
DATED : December 11, 2012
INVENTOR(S) : Viano et al.

Page 1 of 1

It is certified that error appears in the above-identified patent and that said Letters Patent is hereby corrected as shown below:

Title Page, Item (73)

Delete:

"Assignee: JPMorgan Chase Bank, N.A., Houston, TX (US)"

An insert:

-- Assignee: Lear Corporation, Southfield, MI (US) --

Signed and Sealed this
Eighteenth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO.        : 5,378,043 C2
APPLICATION NO.   : 90/012999
DATED             : April 2, 2014
INVENTOR(S)       : Richard J. Neely et al.

Page 1 of 1

It is certified that error appears in the above-identified patent and that said Letters Patent is hereby corrected as shown below:

On the title page:
Delete:
item "(73)    Assignee:    JPMorgan Chase Bank, N.A. Chicago IL (US)"

and insert:
item -- (73)   Assignee:    Lear Corporation, Southfield MI (US) --

Signed and Sealed this
Eighth Day of July, 2014

Michelle K. Lee
*Deputy Director of the United States Patent and Trademark Office*

(12) EX PARTE REEXAMINATION CERTIFICATE (9431st)
United States Patent
Viano et al.

(10) Number: US 5,378,043 C1
(45) Certificate Issued: Dec. 11, 2012

(54) VEHICLE PIVOTAL HEADREST

(75) Inventors: David C. Viano, Bloomfield Hill, MI (US); Richard J. Neely, Casco, MI (US); Mladen Humer, East Detroit, MI (US)

(73) Assignee: JPMorgan Chase Bank, N.A., Houston, TX (US)

Reexamination Request:
No. 90/009,250, Aug. 14, 2008
No. 90/011,088, Jul. 9, 2010

Reexamination Certificate for:
Patent No.: 5,378,043
Issued: Jan. 3, 1995
Appl. No.: 08/069,317
Filed: Jun. 1, 1993

Certificate of Correction issued Jul. 18, 1995.

(51) Int. Cl.
*B60R 21/00* (2006.01)

(52) U.S. Cl. .................................. 297/408; 297/216.12
(58) Field of Classification Search ............. 297/216.12, 297/216.13, 452.52, 452.54, 452.57
See application file for complete search history.

(56) References Cited

To view the complete listing of prior art documents cited during the proceedings for Reexamination Control Numbers 90/009,250 and 90/011,088, please refer to the USPTO's public Patent Application Information Retrieval (PAIR) system under the Display References tab.

*Primary Examiner* — Jimmy G Foster

(57) ABSTRACT

A vehicle seat and headrest arrangement is provided including a seat bun frame having fore and aft ends, a seatback frame joined to the bun frame adjacent the aft end of the bun frame, and a headrest pivotally attached with the seatback frame along a pivotal axis generally perpendicular to the fore and aft direction whereby, upon a rear vehicle impact, the headrest moves in a forward direction toward the head of a vehicle seat occupant.

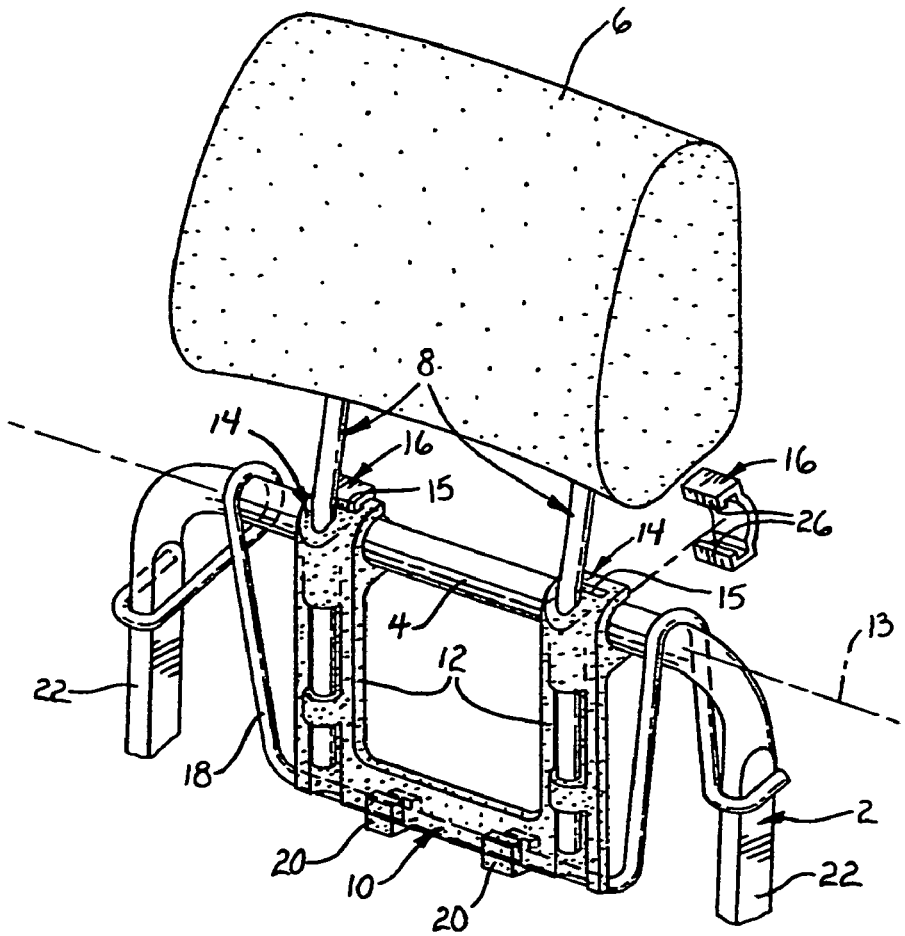

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 10-12 are cancelled.

Claims 2, 4, 5 and 6 are determined to be patentable as amended.

Claims 3 and 7-9, dependent on an amended claim, are determined to be patentable.

New claims 13-96 are added and determined to be patentable.

2. [An arrangement as described in claim 1 further comprising] *A vehicle seat and headrest arrangement comprising:*
*a seat bun frame having fore and aft ends;*
*a seatback frame joined to the bun frame adjacent the aft end of the bun frame;*
*a headrest pivotally attached with the seatback frame along a pivotal axis generally perpendicular to the fore and aft direction whereby, upon a rear impact of a vehicle in which the arrangement is mounted, the pivotal attachment allows the headrest to move in a forward direction toward the head of an occupant of the vehicle seat, wherein the headrest has a cushion portion;*
*an impact target operatively associated with the cushion portion and pivotally associated with the seatback frame, wherein a force, in the aft direction from the rear impact, upon the impact target causes the headrest to rotate forwardly; and*
a spring operatively associated with the seatback frame biasing the headrest against pivotal movement.

4. An arrangement as described in claim [1] *2* wherein the headrest effectively extends upwardly upon its pivotal movement toward the head of a seat occupant.

5. An arrangement as described in claim 8 wherein the headrest is connected with [a] *the* post, and the headrest extends rearwardly of the pivotal axis of the headrest.

6. An arrangement as described in claim [1] *2* wherein the headrest cushion portion is separated from the seatback frame by a post.

*13. An arrangement as described in claim 2 wherein the seatback frame comprises a pair of spaced apart side members joined by a cross frame member.*

*14. An arrangement as described in claim 13 wherein the seatback frame is shaped as an inverted 'U'.*

*15. An arrangement as described in claim 2 wherein the seatback frame comprises a cross member; and*
*wherein the headrest is operably connected to the cross member.*

*16. An arrangement as described in claim 2 wherein the seatback frame comprises a cross member; and*
*wherein the headrest is connected to the cross member to move relative to the cross member as the headrest pivots.*

*17. An arrangement as described in claim 2 wherein the seatback frame comprises a cross member; and*
*wherein the headrest is connected to the cross member to translate relative to the cross member as the headrest pivots.*

*18. An arrangement as described in claim 2 wherein the seatback frame comprises a cross member; and*
*wherein the headrest is pivotally connected to the cross member.*

*19. An arrangement as described in claim 18 wherein the headrest is pivotal about an axis that is forward of the cross member.*

*20. An arrangement as described in claim 2 wherein the seatback frame comprises a cross member; and*
*wherein the headrest is operably connected to the cross member to translate and pivot relative to the cross member.*

*21. An arrangement as described in claim 2 wherein the seatback frame comprises a pair of side members; and*
*wherein the headrest is operably connected to at least one of the pair of side members to pivot relative to the pair of side members.*

*22. An arrangement as described in claim 2 wherein the seatback frame comprises a pair of side members; and*
*wherein the headrest is operably connected to at least one of the pair of side members to translate relative to the pair of side members.*

*23. An arrangement as described in claim 2 wherein the seatback frame comprises a pair of side members; and*
*wherein the headrest is operably connected to at least one of the pair of side members to pivot and translate relative to the pair of side members.*

*24. An arrangement as described in claim 2 wherein the seatback frame comprises a pair of side members; and*
*wherein the impact target is operably connected to at least one of the pair of side members to pivot relative to the pair of side members.*

*25. An arrangement as described in claim 2 wherein the seatback frame comprises a pair of side members; and*
*wherein the impact target is operably connected to at least one of the pair of side members to translate relative to the pair of side members.*

*26. An arrangement as described in claim 2 wherein the seatback frame comprises a pair of side members; and*
*wherein the impact target is operably connected to at least one of the pair of side members to pivot and translate relative to the pair of side members.*

*27. An arrangement as described in claim 26 wherein the impact target translates upwardly and rearwardly relative to the pair of side members so that the headrest cushion portion translates upwardly and pivots forwardly upon the rear impact of the vehicle.*

*28. An arrangement as described in claim 2 wherein the spring is operably associated with the seatback frame and the impact target.*

*29. An arrangement as described in claim 2 wherein the spring extends downwardly.*

*30. An arrangement as described in claim 2 wherein the spring returns the headrest after the force to the impact target is released.*

*31. An arrangement as described in claim 2 wherein the spring is loaded thereby biasing the headrest against pivotal movement.*

*32. An arrangement as described in claim 2 wherein the seatback frame comprises a pair of spaced apart side members joined by a cross frame member; and* wherein the spring wraps around an intersection of the side members with the cross member.

33. An arrangement as described in claim 2 further comprising a plurality of clips attaching the spring to the impact target.

34. An arrangement as described in claim 2 wherein the seatback frame comprises a cross member and the impact target is pivotally mounted to the cross member along the pivotal axis.

35. An arrangement as described in claim 34 wherein the pivotal axis is fixed.

36. An arrangement as described in claim 34 further comprising a clamp connecting the impact target to the cross member.

37. An arrangement as described in claim 36 wherein the clamp comprises a metal clip.

38. An arrangement as described in claim 37 wherein the metal clip comprises a pair of flanges that are received within apertures in the impact target.

39. An arrangement as described in claim 6 wherein the spring is connected to the seatback frame and the post.

40. An arrangement as described in claim 6 wherein the impact target has a formed alignment member for the post for mounting the headrest to the seatback frame.

41. An arrangement as described in claim 6 wherein the headrest post is adjustable vertically for adjusting a height of the headrest cushion portion.

42. An arrangement as described in claim 6 further comprising a plurality of clips attaching the impact target to the post.

43. An arrangement as described in claim 6 further comprising a second post separating the headrest cushion portion from the seatback frame.

44. An arrangement as described in claim 6 wherein the seatback frame comprises a cross member; and
wherein the post is operably connected to the cross member.

45. An arrangement as described in claim 6 wherein the seatback frame comprises a cross member; and
wherein the post is connected to the cross member to translate relative to the cross member as the headrest pivots.

46. An arrangement as described in claim 6 wherein the seatback frame comprises a cross member; and
wherein the post is pivotally connected to the cross member to pivot as the headrest pivots.

47. An arrangement as described in claim 6 wherein the seatback frame comprises a cross member; and
wherein the post is operably connected to the cross member to translate and pivot relative to the cross member as the headrest pivots.

48. An arrangement as described in claim 47 wherein the post has a variable axis of rotation with respect to the cross member.

49. An arrangement as described in claim 47 wherein the post is operably connected to the cross member by a bushing.

50. An arrangement as described in claim 49 wherein the bushing is elastomeric.

51. An arrangement as described in claim 49 wherein the bushing is mounted in a clip fitted on the cross member.

52. An arrangement as described in claim 6 wherein the seatback frame further comprises at least one angular cam guide; and
wherein the post further comprises a loop section cooperating with the at least one angular cam guide.

53. An arrangement as described in claim 52 wherein the angular cam guide has a generally downward slope projecting generally forwardly.

54. An arrangement as described in claim 2 wherein the pivotal axis is fixed.

55. An arrangement as described in claim 2 wherein the pivotal axis is non-fixed.

56. An arrangement as described in claim 2 wherein the pivotal axis of the headrest is oriented between the headrest and the impact target.

57. A vehicle seat and headrest arrangement comprising:
a seat bun frame having fore and aft ends;
a seatback frame joined to the bun frame adjacent the aft end of the bun frame;
a headrest pivotally attached with the seatback frame along a pivotal axis generally perpendicular to the fore and aft direction whereby, upon a rear impact of a vehicle in which the arrangement is mounted, the pivotal attachment allows the headrest to move in a forward direction toward the head of an occupant of the vehicle seat;
a target pivotally mounted to the seatback along a pivotal axis generally perpendicular to the fore and aft direction underneath the headrest and operatively associated with the headrest wherein loading of the target, in the aft direction from the rear impact, causes the headrest to pivot forwardly; and
a spring operatively associated with the seatback frame biasing the headrest against pivotal movement.

58. An arrangement as described in claim 57 wherein the headrest effectively extends upwardly upon its pivotal movement toward the head of a seat occupant.

59. An arrangement as described in claim 57 wherein the headrest is separated from the seatback frame by a post.

60. An arrangement as described in claim 59 having said target operatively associated with at least one cam guide member.

61. An arrangement as described in claim 59 wherein the headrest is connected with the post, and the headrest extends rearwardly of the pivotal axis of the headrest.

62. An arrangement as described in claim 59 further including the seatback frame having a cross member and wherein the post is operatively associated with the target and a cam guide to direct the target and wherein the post has a pivotal axis with respect to the cross member which is non-fixed with respect to the post upon impact upon the target, causing the headrest to pivot forwardly and extend upwardly.

63. An arrangement as described in claim 57 wherein the seatback frame comprises a pair of spaced apart side members joined by a cross frame member.

64. An arrangement as described in claim 63 wherein the seatback frame is shaped as an inverted 'U'.

65. An arrangement as described in claim 57 wherein the seatback frame comprises a cross member; and
wherein the headrest is operably connected to the cross member.

66. An arrangement as described in claim 57 wherein the seatback frame comprises a cross member; and
wherein the headrest is connected to the cross member to move relative to the cross member as the headrest pivots.

67. An arrangement as described in claim 57 wherein the seatback frame comprises a cross member; and
wherein the headrest is connected to the cross member to translate relative to the cross member as the headrest pivots.

68. An arrangement as described in claim 57 wherein the seatback frame comprises a cross member; and
wherein the headrest is pivotally connected to the cross member.

69. An arrangement as described in claim 68 wherein the headrest is pivotal about an axis that is forward of the cross member.

70. An arrangement as described in claim 57 wherein the seatback frame comprises a cross member; and
 wherein the headrest is operably connected to the cross member to translate and pivot relative to the cross member.

71. An arrangement as described in claim 57 wherein the seatback frame comprises a pair of side members; and
 wherein the headrest is operably connected to at least one of the pair of side members to pivot relative to the pair of side members.

72. An arrangement as described in claim 57 wherein the seatback frame comprises a pair of side members; and
 wherein the headrest is operably connected to at least one of the pair of side members to translate relative to the pair of side members.

73. An arrangement as described in claim 57 wherein the seatback frame comprises a pair of side members; and
 wherein the headrest is operably connected to at least one of the pair of side members to pivot and translate relative to the pair of side members.

74. An arrangement as described in claim 57 wherein the seatback frame comprises a pair of side members; and
 wherein the target is operably connected to at least one of the pair of side members to pivot relative to the pair of side members.

75. An arrangement as described in claim 57 wherein the seatback frame comprises a pair of side members; and
 wherein the target is operably connected to at least one of the pair of side members to translate relative to the pair of side members.

76. An arrangement as described in claim 57 wherein the seatback frame comprises a pair of side members; and
 wherein the target is operably connected to at least one of the pair of side members to pivot and translate relative to the pair of side members.

77. An arrangement as described in claim 76 wherein the target translates upwardly and rearwardly relative to the pair of side members so that the headrest translates upwardly and pivots forwardly upon the rear impact of the vehicle.

78. An arrangement as described in claim 57 wherein the spring is operably associated with the seatback frame and the target.

79. An arrangement as described in claim 57 wherein the spring extends downwardly.

80. An arrangement as described in claim 57 wherein the spring returns the headrest after the force to the target is released.

81. An arrangement as described in claim 57 wherein the spring is loaded thereby biasing the headrest against pivotal movement.

82. An arrangement as described in claim 59 wherein the spring is connected to the seatback frame and the post.

83. An arrangement as described in claim 59 wherein the headrest post is adjustable vertically for adjusting a height of the headrest.

84. An arrangement as described in claim 59 further comprising a second post separating the headrest from the seatback frame.

85. An arrangement as described in claim 59 wherein the seatback frame comprises a cross member; and
 wherein the post is operably connected to the cross member.

86. An arrangement as described in claim 59 wherein the seatback frame comprises a cross member; and
 wherein the post is connected to the cross member to translate relative to the cross member as the headrest pivots.

87. An arrangement as described in claim 59 wherein the seatback frame comprises a cross member; and
 wherein the post is pivotally connected to the cross member to pivot as the headrest pivots.

88. An arrangement as described in claim 59 wherein the seatback frame comprises a cross member; and
 wherein the post is operably connected to the cross member to translate and pivot relative to the cross member as the headrest pivots.

89. An arrangement as described in claim 88 wherein the post has a variable axis of rotation with respect to the cross member.

90. An arrangement as described in claim 88 wherein the post is operably connected to the cross member by a bushing.

91. An arrangement as described in claim 90 wherein the bushing is elastomeric.

92. An arrangement as described in claim 90 wherein the bushing is mounted in a clip fitted on the cross member.

93. An arrangement as described in claim 57 wherein the pivotal axis of the headrest is non-fixed.

94. An arrangement as described in claim 57 wherein the pivotal axis of the headrest is oriented between the headrest and the target.

95. A method of providing a headrest for a vehicle seat having a seatback frame connected to an aft end of a fore and aft seat bun frame, the method comprising:
 pivotally attaching a headrest which is operatively associated with an impact target, with a pivotal axis generally perpendicular to the fore and aft direction of the seat;
 biasing the headrest against pivotal movement with a spring; and
 upon a rear impact of a vehicle in which the vehicle seat is mounted, contacting the impact target with a rearwardly directed force, thereby overcoming the spring and pivoting the headrest forward to contact a head of a seat occupant.

96. A method as described in claim 95 further comprising extending the headrest upwardly.

\* \* \* \* \*

(12) EX PARTE REEXAMINATION CERTIFICATE (10093rd)

United States Patent
Viano et al.

(10) Number: US 5,378,043 C2
(45) Certificate Issued: Apr. 2, 2014

(54) VEHICLE PIVOTAL HEADREST

(75) Inventors: David C. Viano, Bloomfield Hill, MI (US); Richard J. Neely, Casco, MI (US); Mladen Humer, East Detroit, MI (US)

(73) Assignee: JPMorgan Chase Bank, N.A., Chicago, IL (US)

Reexamination Request:
No. 90/012,999, Sep. 16, 2013

Reexamination Certificate for:
Patent No.: 5,378,043
Issued: Jan. 3, 1995
Appl. No.: 08/069,317
Filed: Jun. 1, 1993

Reexamination Certificate C1 5,378,043 issued Dec. 11, 2012

Certificate of Correction issued Jul. 18, 1995
Certificate of Correction issued Jun. 18, 2013

(51) Int. Cl.
*B60R 21/00* (2006.01)

(52) U.S. Cl.
USPC .................................. 297/408; 297/216.12

(58) Field of Classification Search
None
See application file for complete search history.

(56) References Cited

To view the complete listing of prior art documents cited during the proceeding for Reexamination Control Number 90/012,999, please refer to the USPTO's public Patent Application Information Retrieval (PAIR) system under the Display References tab.

*Primary Examiner* — Jeffrey R Jastrzab

(57) ABSTRACT

A vehicle seat and headrest arrangement is provided including a seat bun frame having fore and aft ends, a seatback frame joined to the bun frame adjacent the aft end of the bun frame, and a headrest pivotally attached with the seatback frame along a pivotal axis generally perpendicular to the fore and aft direction whereby, upon a rear vehicle impact, the headrest moves in a forward direction toward the head of a vehicle seat occupant.

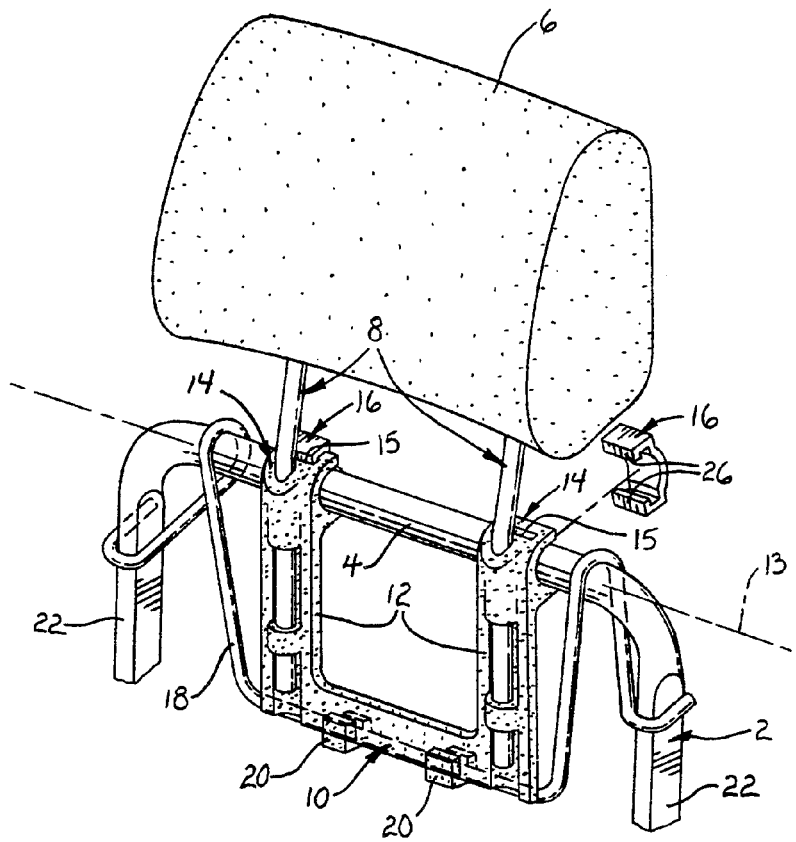

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 2-9, 13-51 and 54-96 is confirmed.

Claims 1 and 10-12 were previously cancelled.

Claims 52 and 53 were not reexamined.

* * * * *